Sept. 2, 1969     A. BERGES ET AL     3,465,282
LIGHT FITTING

Filed Jan. 24, 1968     4 Sheets-Sheet 1

Inventors:
A. BERGES, K. WEHLING
& E. RÜBSAMEN
By Lowry & Rinehart
ATTYS.

Sept. 2, 1969   A. BERGES ETAL   3,465,282
LIGHT FITTING

Filed Jan. 24, 1968   4 Sheets-Sheet 2

Inventors:
A. BERGES, K. WEHLING
& E. RÜBSAMEN
By
Lowry Rinehart
ATTYS.

Inventors:
A. BERGES, K. WEHLING
& E. RÜBSAMEN
ATTYS.

United States Patent Office 3,465,282
Patented Sept. 2, 1969

3,465,282
LIGHT FITTING
Arnold Berges, Fassensteg 5, Hohenhausen, Lippe, Germany, and Karl Wehling, Reinertstr. 19, and Erich Rübsamen, Slavertrift 32, both of Lemgo, Lippe, Germany
Filed Jan. 24, 1968, Ser. No. 700,087
Int. Cl. H01r 13/60; F21p 1/02; F21s 1/06
U.S. Cl. 339—121                                    7 Claims

ABSTRACT OF THE DISCLOSURE

A light fitting includes a connection body in the form of a housing with connection bodies arranged therein for light bulbs and the like. The wall of the connection body is of shell-like configuration and provided with openings and holding and connecting devices. The connecting devices are to be fixed in said holes and connected to the electric circuit interconnecting the bulbs. The connecting devices are provided for the bulbs and/or for holding members for at least one further connection body.

BACKGROUND OF THE INVENTION

This invention relates to a light fitting including a connection body in the form of a housing.

With the light fittings of this type known up to now electric lines extend from a connection body serving as distributor to light bulb receiving sockets arranged in and/or on holding arms or the like. Such light fittings are expensive to manufacture and are expensive and troublesome in construction and assembly.

Modern architecture requires for favorable room illumination and for the creation of highlights to set off shapes ever more multiple-bulb light fittings in the shape of stars and/or in several planes which are easily manufactured and mounted and preferably can be connected in different arrangements with adjacent light fittings according to the unit box principle. This has not been possible with the light fittings known up to now, and a lighting plant deviating from the conventional practice disadvantageously requires expensive special production.

SUMMARY OF THE INVENTION

It is the object of the present invention to provide a light fitting avoiding such drawbacks, the connection body of which is simply manufactured and assembled, and which makes it possible to arrange the light bulbs in different manners as well as simply to be able to line them up with each other in different combinations.

To attain this object, the present invention provides a light fitting including a connection body in the form of a housing with connection devices arranged therein for light bulbs and the like, wherein the wall of the connection body is of shell-like configuration and provided with openings and holding and connecting devices to be fixed in said holes and connected to the electric circuit interconnecting the bulbs, said devices being provided for the bulbs and/or for holding members for at least one further connection body.

In a preferred embodiment of the invention, the connection body is assembled from a plurality of shell parts and is formed as a sphere with radially extending holes. The individual shell parts can be connected together by means of plug and/or screw connections.

Such a light fitting is of simple construction and permits the rational provision of a lighting plant with three-dimensionally arranged light bulbs. Only one electric connection is necessary to power such a lighting plant. Light fittings coupled together can be separated in a simple manner and used singly.

BRIEF DESCRIPTION OF THE DRAWINGS

Several embodiments of the invention will now be described by way of example and with reference to the accompanying drawings, in which.

DESCRIPTION OF THE PREFERRED EMBODIMENTS

Figure 1:
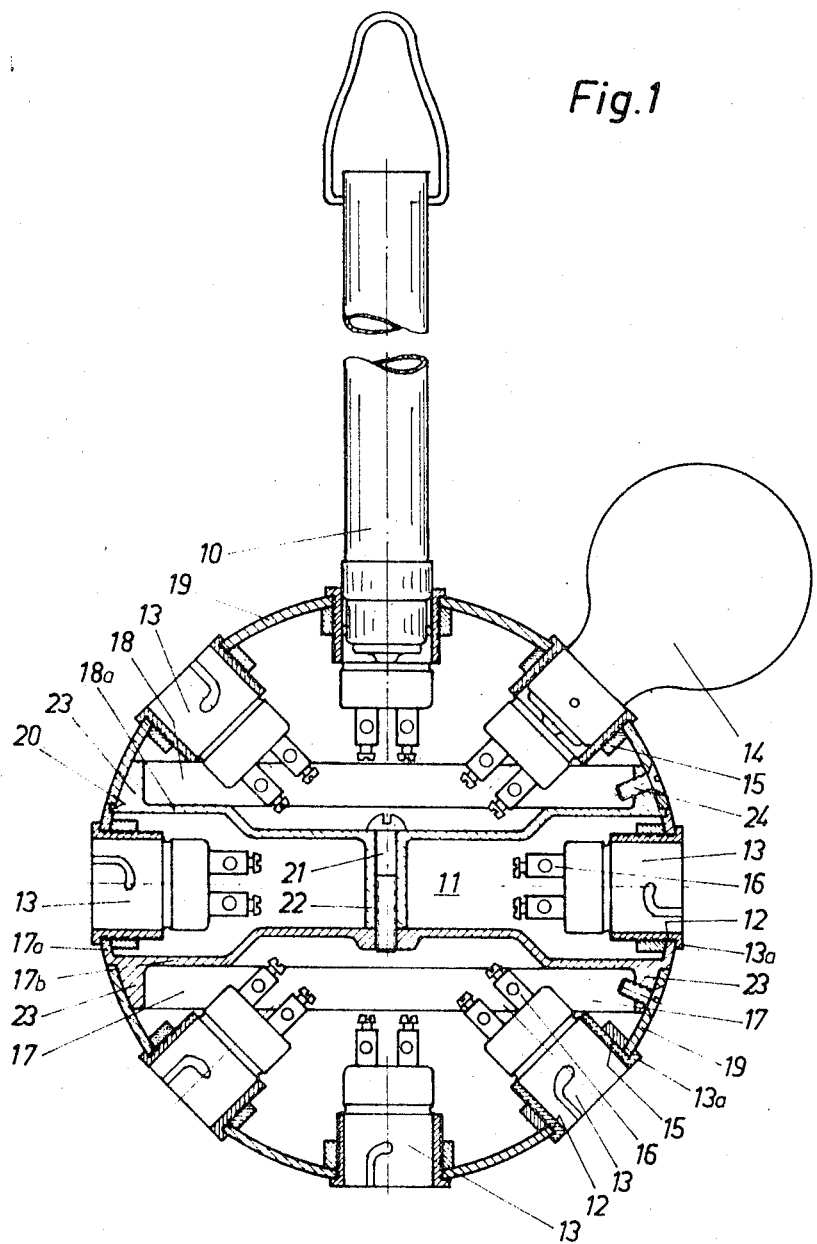
FIG. 1 is a vertical section through a light fitting with a multi-part spherical connection body.

A light fitting according to the invention comprises a multi-part connection body 11 held by a hanging-up member 10 and having a preferably spherical housing provided with radially extending holes 12 for the reception of connecting devices such as light-bulb sockets 13 for the direct or indirect mounting of light bulbs 14 (cf. FIGS. 1 to 5).

Due to the holes 12, a three-dimensional lamp arrangement is possible. Preferably, the central axes of all of the holes 12 correspond to radii of the connection body 11 standing at 45° to one another. Thus, eight holes 12 lie in each of the four planes extending at 45° to each other and passing through the center of the connection body 11. A connection body 11 built in such a manner therefore has twenty-six holes 12 and offers, when in a completely assembled condition and connected up for use, FIG. 1, twenty-five possible connections which are distributed over the entire spherical outer surface of the connection body 11.

All holes 12 have a circular cross section and the same size. The light-bulb sockets 13 mounted in said holes have a rim 13a on their outside end, which rim 13a bears against the external surface of the housing of the connection body 11. Each of the shafts of the light-bulb socke's 13 projecting through the holes 12 is advantageously provided with threads and accommodates a threaded ring 15 which fixes a light-bulb socket 13 in axial direction and bears against the inner wall of the connection body 11, FIG. 1. In addi'ion the light-bulb socket 13 can be fixed on the connection body 11 by means of plug and/or screw connections.

The light-bulb sockets 13 are preferably made as sockets wi'h a bayonet locking for the light bulbs 14. Light-bulb sockets 13 with generally customary screw connections can also be provided for fixing the light bulbs 14 or the like.

The light-bulb sockets 13 have terminals 16 known per se on their insides, rear end, FIG. 1. All light-bulb sockets 13 of a connection body 11 are connected jointly to an electric circuit. In this manner twenty-five light-bulb sockets 13 can receive electric energy after any one of the twenty-six light-bulb sockets 13 is connected to an electric circuit.

The spherical housing of the connection body 11 preferably comprises four parts (cf. FIG. 1). Two identical cup-shaped housing shells 19 which lie opposite each other as in a mirror image are secured to a two-part middle body consisting of a middle section 17 and a middle-section top 18 which are connected to each other by means of plug and/or screw connections.

The two-part and largely symmetrically formed middle body located in the middle area of the connection body 11 has its middle section 17 open towards one of the cup-shaped housing shells 19, and the middle section top 18 is mounted on the open side of the middle section 17.

Advantageously, said middle-section top 18 engages in a stepped inside edge portion 20 of a curved outer wall 17a of the middle section 17 which curved outer wall 17a has the same shape on both sides of the central plane of the spherical housing and is located between the two cup-shaped housing shells 19. As shown in FIG. 1, the section top 18 includes a circular base 18a and the surface thereof facing the housing shell is lying in the same plane as the adjacent leading edge of the outer wall 17a.

The middle section 17 and the middle-section top 18 are detachably connected to each other in their central region by means of a screw 21 preferably held on the longitudinal axis of the middle body.

In order to brace the middle section 17 and the middle-section top 18 of the two-part middle body against each other also in their center, a socket 22 made up as a lengthened boss is provided on one wall of each of these two parts 17, 18 to brace against the opposing wall of the other part. The socket 22 preferably is an integral part of the circular base 18a of the middle-section top 18, and accommodates the screw 21 while bearing with its free end against a middle-section wall 17b which is provided with a threaded boring and a strengthened boss-like portion in that area for securing the screw 21.

Figure 4:
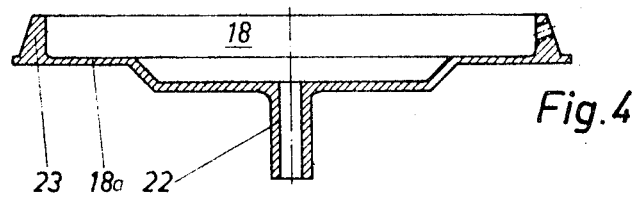
FIG. 4 is a vertical section through a middle-section top capable of receiving a cup-shaped housing shell, which top engages in another middle part which engages the other cup-shaped housing shell.
Figure 5:
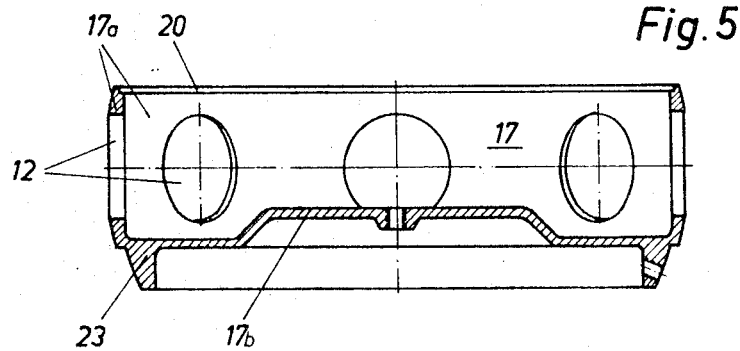
FIG. 5 is a vertical section through a middle section of the connection body of FIG. 1.

As can be seen from FIGS. 1, 4 and 5, the peripheral portion of both the middle section 17 and the middle-section top 18 are each provided with a mounting rim 23 inset to allow for the thickness of the wall of the corresponding cup-shaped housing shell 19. The mounting rims 23 are formed on their outside to correspond to the inner wall of the respective cup-shaped housing shell 19 in the area near the middle body, and are of circular configuration. Further, the mounting rims 23 form a bent portion with the middle-section wall 17b and with the base 18a, respectively. The cup-shaped housing shells 19 enclose said mounting rims 23 and are detachably connected to the middle body by means of screws 24.

In order to provide space for the accommodation of the light-bulb sockets 13 and the wiring for the cup-shaped housing shells 19, and additionally to reinforce the middle body, the middle-section wall 17b and the circular base 18a of the middle-section top 18 are offset through conical surfaces towards the center of the connection body 11 in the region behind the light-bulb sockets 13 inserted in the middle section 17 as shown in FIGS. 1, 4 and 5.

On the center plane of the connection body 11 which simultaneously is the bisectrix of height and the axis of symmetry of the curved outer wall 17a of the middle section 17, eight holes 12 are arranged in the curved outer wall 17a at 45° to each other, as shown in FIGS. 1 and 5.

The middle-section wall 17b and the circular base 18a of the middle-section top 18 each have at least one hole (not shown) for the passage therethrough of the electric wires for wiring the light-bulb sockets 13.

Figure 2:
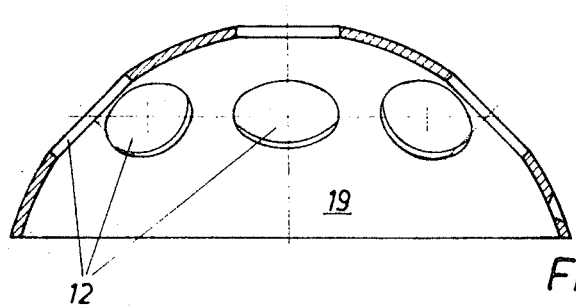
FIG. 2 is a vertical section through a cup-shaped housing shell of the connection body of the light fitting shown in FIG. 1.
Figure 3:
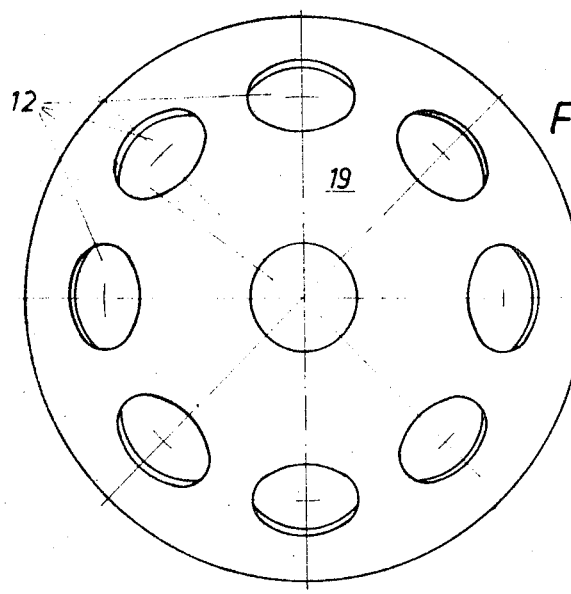
FIG. 3 is a top plan view of the cup-shaped housing shell according to FIG. 2.

As shown in FIGS. 2 and 3, the cup-shaped housing shells 19 are formed as spherical segments of a hollow sphere preferably having a uniform wall thickness. Preferably, each segment has a total of nine holes 12, of which one lies on the center axis of the cup-shaped housing shell 19 and the remaining eight are angularly spaced at 45° to one another on a plane parallel to the edge of cup-shaped housing shell 19 and at a right angle to the center axis, the center axes of all the holes 12 lying on the generatrix of a cone tapering to the central point of the connection body 11 such that the central axes of opposite holes 12 of a cup-shaped housing shell 19 stand at a right angle to each other.

Figure 6:
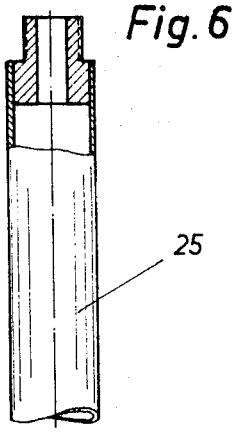
FIG. 6 is a side view of an extension arm for the indirect mounting of light bulbs, partly in section.

If the light bulbs 14 are to be kept at a certain distance from the connection body 11, extension arms 25, FIG. 6, can be mounted in the light-bulb sockets 13. These extension arms 25 have a plug on one end and a socket for a light bulb 14 on the other which are connected to each other by electric wiring, not shown.

Figure 7:
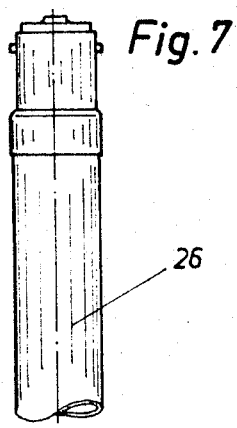
FIG. 7 is a side view of a connecting rod with plugs on both ends.

Connection bodies 11 can be connected together by means of connecting rods 26, FIG. 7, which have electrically connected plugs on both ends for connection with light-bulb sockets 13. In this way it is possible to couple together a plurality of connection bodies 11 in a simple manner at different heights and in different arrangements for a technically and optically unobjectionable lighting plant. Thus, a connection body 11 can be held and supported without any additional hanging-up devices such as a hanging-up member 10 or the like by connecting rods 26 connected to a plurality of adjacent connection bodies 11.

The scope of the invention includes securing the light-bulb sockets 13, which may have a plug or a screwed holder for the light bulbs 14, directly in the walls of the cup-shaped housing shell 19 of the light body 11 by means of screws or the like.

Further, the scope of the invention includes making the connection-body housing out of interconnectable housing shells and housing rings which merely consist of correspondingly formed wall pieces. Moreover, the connection body can be designed for fluorescent tubes, fluorescent-light sockets and starter sockets being alternately provided.

Figure 8:
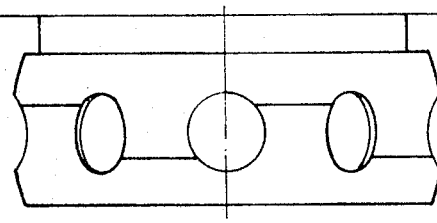
FIG. 8 is a side view of a middle body used as a ceiling lamp.
Figure 9:
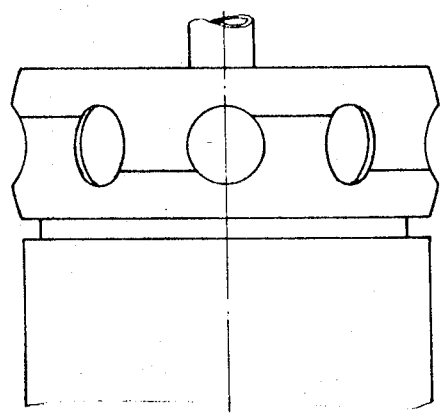
FIG. 9 is a side view of a middle body mounted alone.
Figure 10:
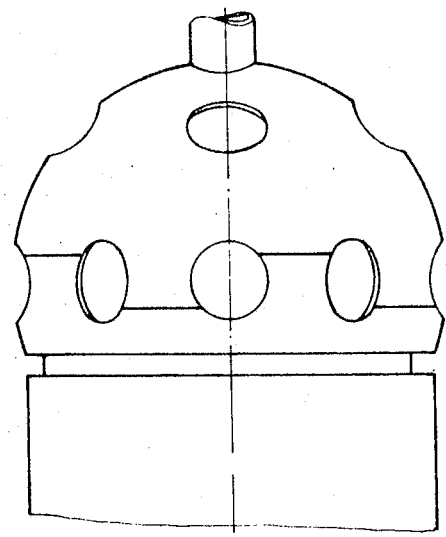
FIG. 10 is a side view of a middle body and one cup-shaped housing shell mounted together.

Further, it is possible to construct the middle part of the connection body 11 such that it alone is usable. In this case, the middle part can serve as junction point for a two-dimensional latticed lighting plant as well as for the three-dimensional connection of lamps and/or light fittings. If an intermediate spacing member is used, it can be arranged on a wall, a ceiling, or as a floor lamp or the like, or can carry conventional light fittings. FIGS. 8 to 10 show side views of corresponding embodiments of the invention, including a combination of a middle part and a cup-shaped housing shell.

The light fitting according to the invention can be manufactured and assembled in a simple manner and it distinguishes itself by manifold possibilities of arranging the light bulbs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:
1. A light fitting comprising, in combination:
  (a) a spherical connection body housing having three body portions including a middle body portion and two outer shell body portions, said portions having outer surfaces which define the sphere,
  (b) means for attaching one of said outer shell body portions to each side of said middle body portion, and
  (c) means for electrically connecting lamps within openings located in said body portions,

(d) said openings being distributed over the entire periphery of the outer shell body portions.

2. A light fitting as defined in claim 1 wherein:
said electrical connecting means include means securing sockets within said openings,
said sockets being uniformly angularly spaced at 45° with respect to one another and having axes of said sockets pointed in a direction toward the center of said connection body housing.

3. A light fitting as defined in claim 2 wherein:
said sockets include means for receiving a nonelectrical structural member.

4. A light fitting as defined in claim 3 including:
a said nonelectrical structural member comprising a tube member for hanging said light fitting.

5. A light fitting as defined in claim 2 including:
said nonelectrical structural member comprising a spacer member for attaching a first light fitting to an adjacent light fitting and for providing a current supply to said adjacent light fitting.

6. A light fitting as defined in claim 2 wherein:
said electrical connecting means include a common circuit means connecting all said sockets within said light fitting.

7. A light fitting as defined in claim 6 wherein:
said sockets include means for receiving a nonelectrical structural member.

References Cited

UNITED STATES PATENTS

| | | | |
|---|---|---|---|
| 530,343 | 12/1894 | Horn | 339—121 X |
| 547,300 | 10/1895 | Smith et al. | 339—121 X |
| 1,043,179 | 11/1912 | Weeks | 339—121 |
| 1,783,020 | 11/1930 | Kozlowski | 339—130 |
| 1,861,604 | 6/1932 | Loring | 240—10 |
| 2,172,757 | 9/1939 | Pollock | 240—10 |
| 2,273,167 | 2/1942 | Anderson | 339—135 X |
| 2,474,356 | 6/1949 | Harris | 339—59 |

FOREIGN PATENTS

| | | |
|---|---|---|
| 536,314 | 1/1957 | Canada. |
| 329,302 | 5/1930 | Great Britain. |

RICHARD E. MOORE, Primary Examiner

U.S. Cl. X.R.

240—10, 78; 339—135